United States Patent
Ante et al.

(10) Patent No.: US 7,340,887 B2
(45) Date of Patent: Mar. 11, 2008

(54) METHOD FOR MONITORING A PARTICLE FILTER

(75) Inventors: Johannes Ante, Regensburg (DE);
Christian Birkner, Irlbach (DE);
Wolfgang Östreicher, Regensburg (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 11/142,614

(22) Filed: Jun. 1, 2005

(65) Prior Publication Data
US 2005/0267670 A1    Dec. 1, 2005

(30) Foreign Application Priority Data
Jun. 1, 2004    (DE) .............. 10 2004 026 589

(51) Int. Cl.
*F01N 3/00*    (2006.01)

(52) U.S. Cl. .............. 60/297; 60/274; 60/277; 60/311; 73/118.1

(58) Field of Classification Search .......... 60/274, 60/276, 277, 295, 297, 311; 73/117.3, 118.1; 701/102, 107, 114
See application file for complete search history.

(56) References Cited

U.S. PATENT DOCUMENTS

| | | | |
|---|---|---|---|
| 4,986,069 A | 1/1991 | Barris et al. | |
| 6,405,528 B1 * | 6/2002 | Christen et al. | 60/295 |
| 6,622,480 B2 * | 9/2003 | Tashiro et al. | 60/295 |
| 6,829,890 B2 * | 12/2004 | Gui et al. | 60/295 |
| 6,865,884 B2 | 3/2005 | Braun et al. | |
| 6,945,037 B2 * | 9/2005 | Plote et al. | 60/311 |
| 6,947,831 B2 * | 9/2005 | van Nieuwstadt | 701/114 |
| 6,964,694 B2 * | 11/2005 | Rauchfuss et al. | 95/1 |
| 6,966,178 B2 * | 11/2005 | Saito et al. | 60/295 |
| 6,968,682 B1 | 11/2005 | Leuz et al. | |
| 7,188,512 B1 * | 3/2007 | Wills | 73/23.31 |
| 2002/0196153 A1 | 12/2002 | Kinugawa et al. | |
| 2004/0011030 A1 | 1/2004 | Braun et al. | |
| 2004/0040285 A1 * | 3/2004 | Strohmaier et al. | 60/277 |
| 2004/0144084 A1 * | 7/2004 | Hara | 60/288 |
| 2005/0178207 A1 | 8/2005 | Stegmaier et al. | |
| 2005/0268597 A1 * | 12/2005 | Kosaka | 60/277 |
| 2006/0089783 A1 * | 4/2006 | Braun | 701/114 |

FOREIGN PATENT DOCUMENTS

| | | |
|---|---|---|
| DE | 100 14 224 A1 | 11/2000 |
| DE | 102 26 963 A1 | 1/2003 |
| DE | 102 13 170 A1 | 10/2003 |
| DE | 102 48 431 A1 | 4/2004 |
| EP | 1 087 114 A1 | 3/2001 |
| JP | 60047937 A | 3/1985 |

* cited by examiner

*Primary Examiner*—Tu M. Nguyen
(74) *Attorney, Agent, or Firm*—Laurence A. Greenberg; Werner H. Stemer; Ralph E. Locher

(57) ABSTRACT

A particle filter is monitored with a sequence of steps. A pressure loss at the particle filter is measured. The volumetric flow of exhaust gas is acquired and a filter load value is calculated from the pressure loss and the volumetric flow of exhaust gas. The filter load value is recorded as a function of a drive parameter and the filter load value is differentiated with respect to the drive parameter. The differentiation of the filter load allows a particle filter breakdown to be deduced when the differentiation is less than or equal to zero.

11 Claims, 3 Drawing Sheets

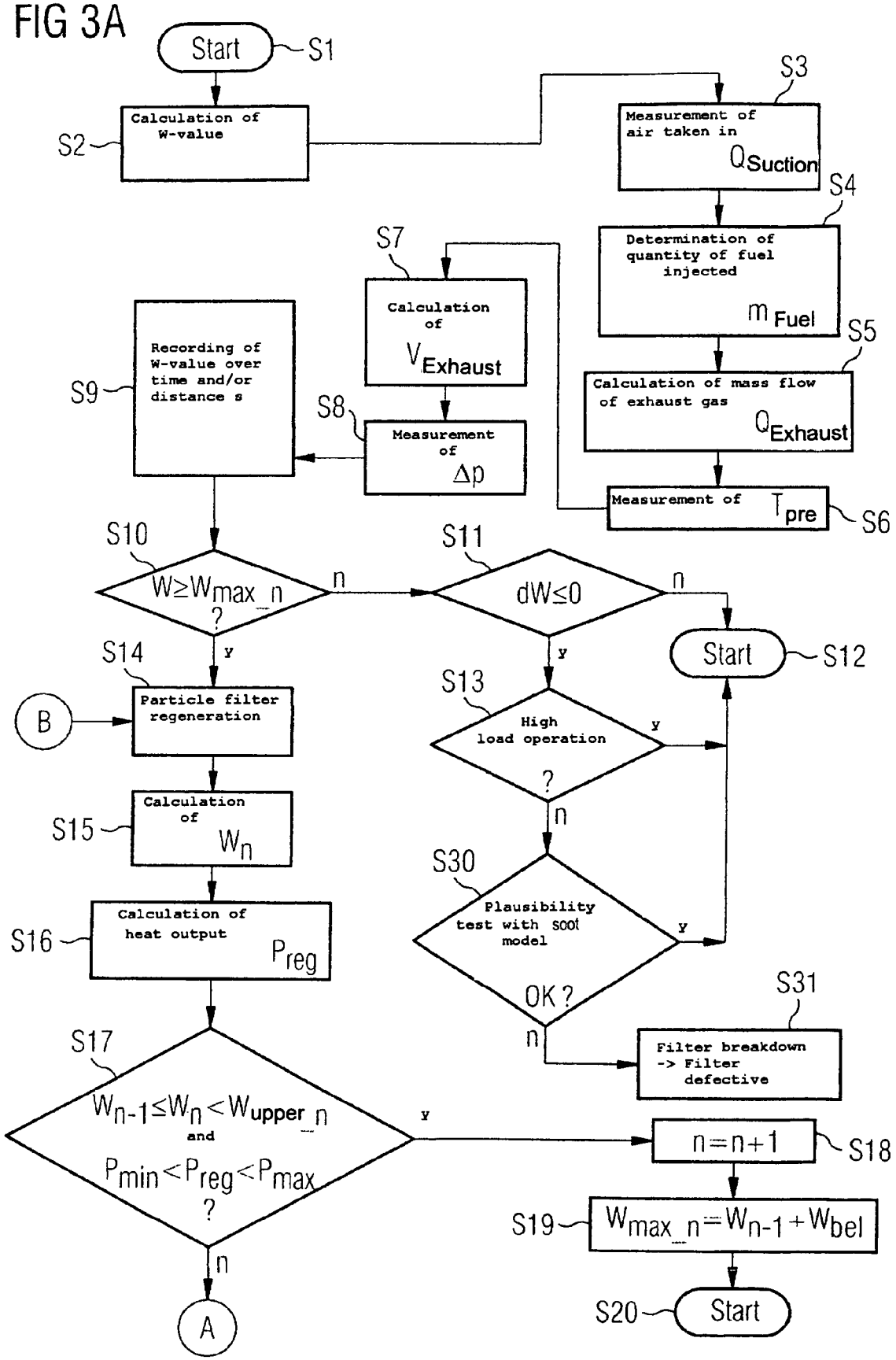

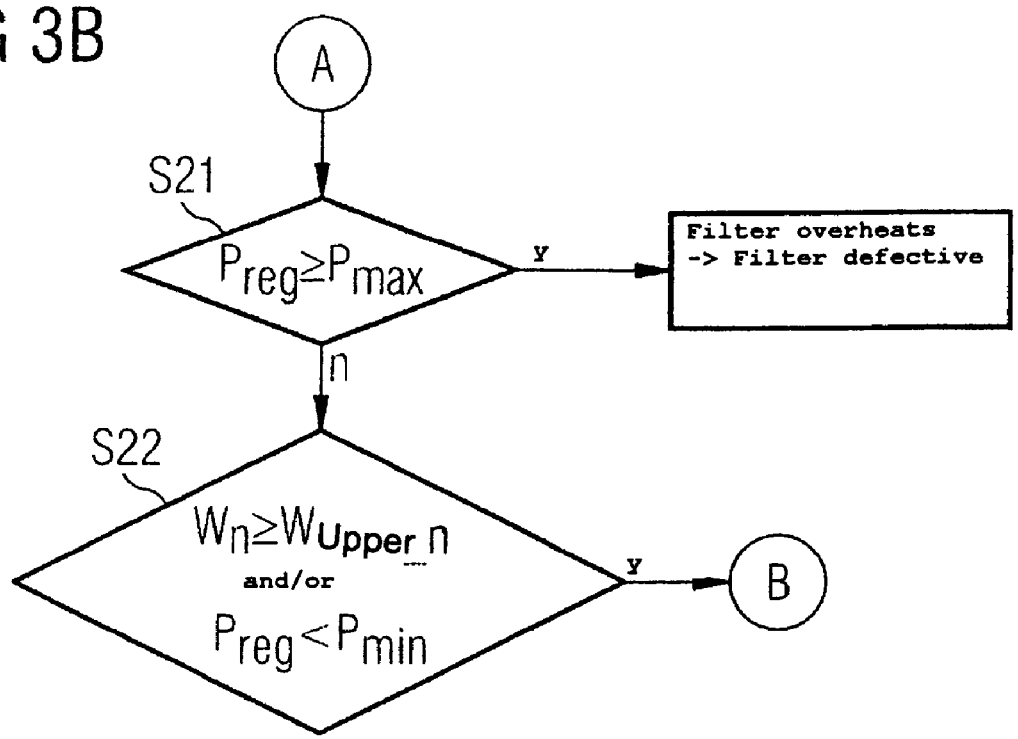
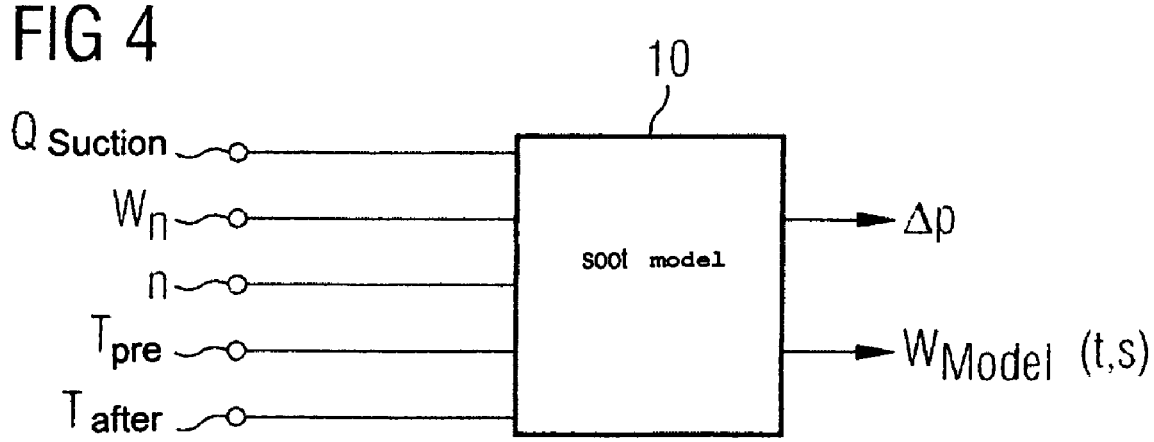

METHOD FOR MONITORING A PARTICLE FILTER

BACKGROUND OF THE INVENTION

Field of the Invention

The invention relates to a method for monitoring a particle filter.

Modern diesel engines are increasingly finding acceptance on the automobile market due to their high performance, good torque characteristics and low consumption. Modern injection systems allow low-carbon combustion but it is extremely difficult to achieve emission class EURO 4 (i.e., Euro-4-Norm) or higher with measures inside the engine.

Exhaust gas analysis in the context of regulatory exhaust gas testing is carried out by measuring exhaust gas turbidity as the engine accelerates freely at full load. An optical opacimeter is used as the measuring device. An opacimeter that can be integrated in the automobile for on-board diagnosis (OBD) of exhaust gas turbidity is not yet available. Commercially available systems as used for exhaust gas analysis are too large and too expensive.

Prior art diesel carbon filter systems monitor the pressure loss at the diesel carbon filter. The volumetric flow of exhaust gas through the diesel carbon filter is calculated from the engine controller data. If the pressure loss $\Delta p$ is divided by the volumetric flow of exhaust gas $V_{exhaust}$, the performance data plotted in FIG. 1 is obtained. It is thereby assumed that the differential pressure $\Delta p$ at the filter changes in a strictly monotonous fashion with the volumetric flow of the exhaust gas $V_{exhaust}$ as a function of the specific load state of the carbon filter (e.g. 0% carbon load). This is shown for example by the curve 1 plotted between the areas a and b. With the internal combustion engine in idle mode this is at point 2. If the load on the internal combustion engine increases, the operating mode of the internal combustion engine moves along the curve 1 to the maximum load at point 3. Thus a specific gradient can be assigned to every load state of the carbon filter, said gradient being a function of the volumetric flow of the internal combustion engine. The gradient of the curve is determined by the quotient of the differential pressure and the volumetric flow of the exhaust gas (also referred to as W-value). In normal driving mode the carbon will fill the filter increasingly, so that the curve 1 becomes steeper and moves through the area b via the area c into the area d. Once the W-value is in the area d, the engine controller initiates regeneration. This causes the filter to heat up, the carbon is burned and the filter is regenerated.

The W-value thereby returns to the area b. If the W-value drops into the area a, the filter has broken, as the exhaust gas can escape unpressurized and unfiltered. Conversely, if the W-value reaches the area e or f, the filter is blocked. The engine controller will output an error report in both instances. With this known diesel carbon filter system it is particularly disadvantageous that it can only identify totally broken filters (no differential pressure) or only completely blocked filters (too high differential pressure). Partially broken or partially burned filters cannot therefore be identified.

A similar strategy is followed by the diesel soot filter system proposed in U.S. Pat. No. 4,986,069. There, a K-value is calculated, which is proportional to the quotient of differential pressure$^X$/(mass air flow$^Y$*temperature$^Z$), with X, Y and Z lying between 0.1 and 2. If a specific K-threshold is exceeded, regeneration of the filter is initiated. Information about the state of the filter cannot therefore be obtained.

SUMMARY OF THE INVENTION

It is accordingly an object of the invention to provide a method of monitoring a particle filter which overcomes the above-mentioned disadvantages of the heretofore-known devices and methods of this general type and which reliably identifies a partial filter breakdown.

With the foregoing and other objects in view there is provided, in accordance with the invention, a method of monitoring a particle filter disposed in an exhaust gas system of an internal combustion engine, the method which comprises the following steps:
a) measuring a pressure loss at the particle filter;
b) obtaining a value for a volumetric flow of exhaust gas;
c) calculating a filter load value from the pressure loss and the volumetric flow of exhaust gas;
d) recording the filter load value as a function of a drive parameter;
e) differentiating the filter load value with respect to the drive parameter to form a filter load differentiation; and
f) evaluating the filter load differentiation, and concluding a particle filter breakdown when the filter load differentiation is less than or equal to zero.

In other words, the invention provides for a method of monitoring a particle filter, which is arranged in the exhaust gas system of an internal combustion engine, in particular a self-igniting such engine. The method according to the invention implements the following steps: First the pressure loss is measured at the particle filter. Next the volumetric flow of exhaust gas is obtained. A filter load value is calculated from the pressure loss and the volumetric flow of exhaust gas. This filter load value is recorded as a function of a drive parameter. Next the filter load curve is differentiated according to the drive parameter. Finally the differentiation curve for filter load is analyzed, with the particle filter demonstrating breakdown when the differentiation is less than or equal to 0.

With this inventive method it is possible to monitor the particle filter without a need for additional sensors. As long as the filter is not broken, the exhaust gas is adequately filtered. Monitoring the engine and monitoring the differentiation of the filter load value ensures that there is no or little soot in the exhaust gases escaping from the exhaust system.

In one advantageous embodiment of the invention the operating time of the internal combustion engine and/or the distance covered by a vehicle with the internal combustion engine is/are selected as the drive parameter(s). In the case of utility vehicles, which are preferably operated locally, the operating time will be a significant drive parameter. In contrast the distance covered is a significant drive parameter for automobiles.

In accordance with an additional feature of the invention, the volumetric flow of exhaust gas is obtained from the first temperature measured in the flow direction before the filter, the air taken in through the internal combustion engine and the quantity of fuel injected into the internal combustion engine. This is particularly advantageous, as no additional sensor is required in the flow direction behind the filter to measure the volumetric flow of exhaust gas. The values for this are obtained from existing sensors.

In accordance with a further advantageous embodiment these are differentiated and evaluated in the mean load range of the internal combustion engine and/or when the processor controlling the internal combustion engine is subject to a low level of utilization. This is particularly advantageous, as the analysis (differentiation, evaluation) is carried out, when adequate processor power is available. An ECU (Electronic Control Unit) is understood to be the processor. This offers the possibility of operating with relatively low-power processors.

In a further advantageous embodiment of the invention, filter load values recorded in high-load operation of the internal combustion engine are to be excluded. During long motorway full-throttle journeys or in similar operating states it is possible to heat the carbon filter or particle filter up to carbon ignition temperature. In this instance the filter is not loaded further but is regenerated even without intervention on the part of the engine controller (self-regeneration). The filter load value does not increase further but can even fall. It is therefore particularly advantageous to record the load state of the internal combustion engine, in order to identify such corresponding full-throttle journeys. Differentiation of such a filter load value dW results in a value, which is smaller than or equal to 0. Such full-throttle journeys (high-load operations) should therefore be removed or excluded from the evaluation, in order to avoid incorrect diagnosis.

In accordance with again a further advantageous embodiment of the invention the calculated filter load value is corrected as a function of the number of particle filter regeneration operations carried out. Each regeneration leaves an ash residue on the filter, which causes a certain loss of flow. Therefore with each regeneration the filter load value no longer returns to its initial value but is increased by a specific amount. The ash load therefore simulates a higher carbon load than is actually present. This phenomenon must be taken into account by correcting the load value or by tracing the maximum value for the particle filter load, i.e. correcting this maximum value instead of the filter load value. This is particularly advantageous, as an old filter impaired by ash can be regenerated at the latest possible time. Also the capacity of the filter is utilized to the maximum, thereby saving fuel.

Other features which are considered as characteristic for the invention are set forth in the appended claims.

Although the invention is illustrated and described herein as embodied in a method for monitoring a particle filter, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIGS. 3A, B show flow diagrams for the method according to the invention; and

FIG. 4 shows a block diagram of the soot model.

DESCRIPTION OF THE PREFERRED EMBODIMENTS

Figure 1:
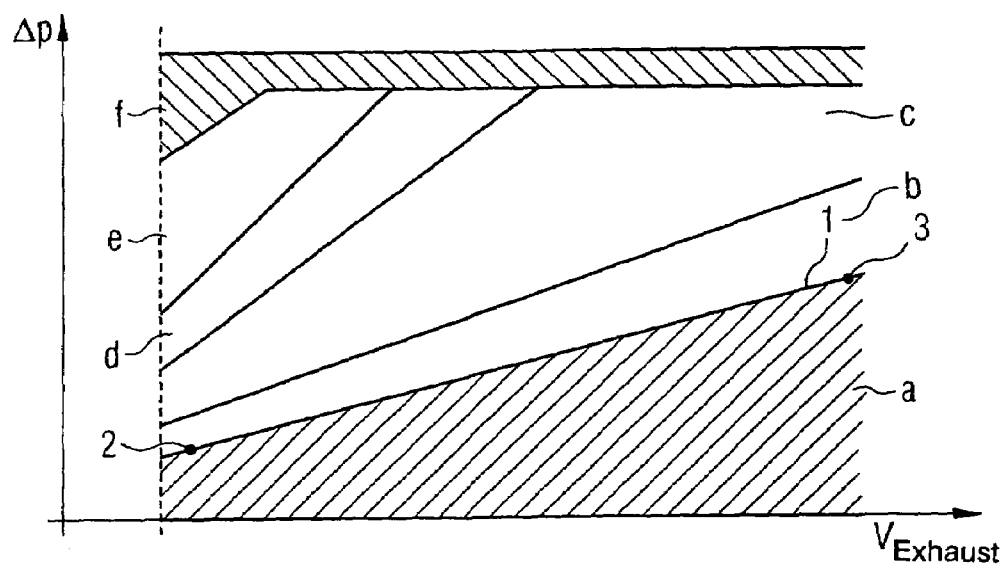
FIG. 1 shows performance data for pressure loss as a function of the volumetric flow of exhaust gas.

Referring now to the figures of the drawing in detail and first, particularly, to FIG. 1 thereof, there is shown a diagram with performance data for differential pressure as a function of volumetric flow of exhaust gas. The area a indicates when the particle filter is defective. The area b indicates when the filter is regenerated. The area c indicates that the filter is loaded. The area d indicates that the filter requires regeneration. The area e indicates that the filter is overloaded. During regeneration of an overloaded filter too much heat is generated so that the filter is permanently damaged by regeneration in this area e. The area f indicates a completely blocked filter.

FIGS. 3A and B show flow diagrams of the implementation of the method according to the invention. The method is started in step S1. The filter load value W is calculated in step S2. This calculation takes place through steps S3 to S8. The air taken in $Q_{suction}$ is first measured in step S3. In step S4 for quantity of fuel injected $m_{fuel}$ is determined from the engine controller. The mass flow of exhaust gas $Q_{exhaust}$ is calculated in step S5 from the air taken in $Q_{suction}$ and the quantity of fuel determined. In step S6 the temperature is measured in the flow direction before the filter $T_{pre}$. The volumetric flow of exhaust gas $V_{exhaust}$ is calculated in step S7 from the mass flow of exhaust gas $Q_{exhaust}$ and the temperature $T_{pre}$. The pressure drop $\Delta p$ caused at the particle filter is measured in step S8. The W-value is calculated by creating the quotient of $\Delta p$ and the volumetric flow of exhaust gas $V_{exhaust}$.

The filter load value W is recorded as a function of the operating time t and/or as a function of the distance covered (distance s). Such a record as a function of the distance covered is shown for example in FIG. 2.

Figure 2:
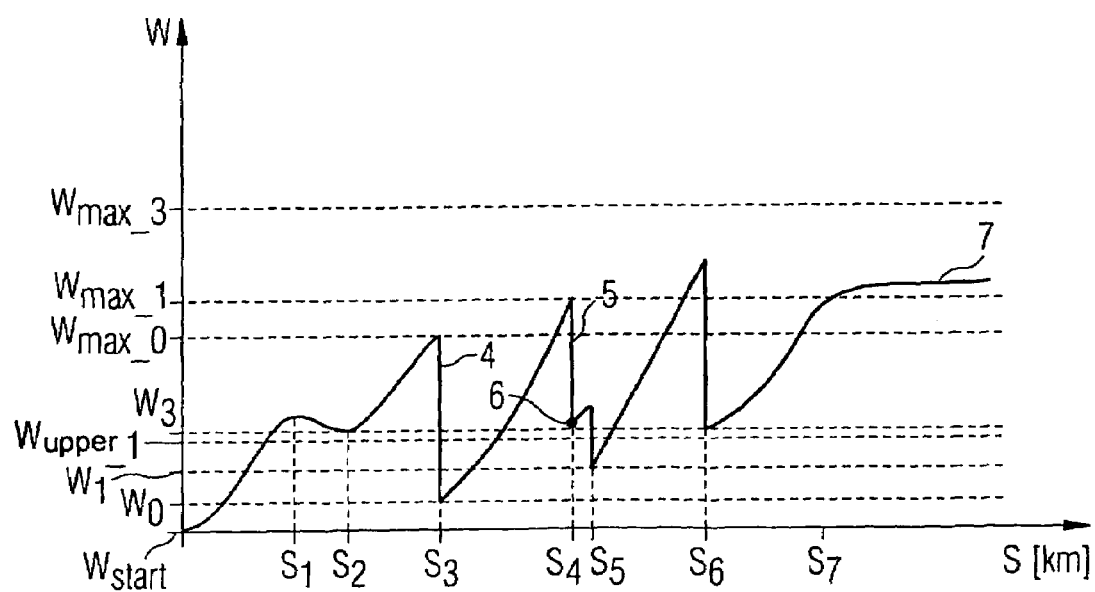
FIG. 2 shows a record of the filter load value as a function of distance covered.

The method according to the invention is described below with reference to FIGS. 2 and 3. In step S10 it is verified whether the current filter load value W has exceeded a maximum value for particle filter load $W_{max\_n}$. The index n represents the number of regeneration operations carried out by the controller. If the current filter load value is below the maximum value $W_{max\_n}$, it is verified whether the differentiation dW in step S11 is less than or equal to 0. The filter load value is differentiated according to the time t or/and according to the distance covered s. If the differentiation is greater than zero, the method proceeds to step S12, which contains a jump condition to the start in step S1. This loop is used to verify continuously whether the filter load value has exceeded a threshold (maximum value for particle filter load) $W_{max\_n}$ and whether the differentiation is less than or equal to 0.The condition in step S10 indicates for how long the particle filter must be regenerated. In step S11 it is verified whether the curve of the filter load value has a plateau or a negative gradient. If this is the case, it must also be verified in step S13 whether the internal combustion engine was in high-load operation in the plateau area. In this instance the filter is not further loaded. It can even regenerate itself (self-regeneration). The filter load value does not increase further. This is shown for example in FIG. 2 between the distances $S_1$ and $S_2$. The filter load value pattern over the distance covered between $S_1$ and $S_2$ even shows a negative gradient. The flow diagram in this instance jumps back to S12 to the start condition. As an alternative to excluding such areas from the consideration or evaluation, these two points $S_1$ and $S_2$ can be merged, so the area in between no longer exists.

The particle filter is further loaded over time until the condition in step S10 is satisfied. This occurs for example in the Figure at point S3. The threshold value $W_{max\_0}$ is thereby exceeded. It should be noted that the index n is equal to zero. The zero indicates that the particle filter has not previously been regenerated by the controller (e.g. in the case of a new vehicle or in the event of a particle filter change). Regeneration of the filter takes place in step S14. This can be seen at point S3 from the slope 4. The filter load value does not thereby drop back to the original value $W_{Start}$, but returns to an initial filter load state $W_0$, which is somewhat higher than the original initial filter load state $W_{Start}$. This is because when the carbon (soot) burns, ash forms and remains in the filter, causing a certain flow loss. It is therefore important in step S15 to calculate this start value after the nth regeneration $W_n$. The exothermic reaction of the carbon burning process generates energy, with the resulting temperature rise being measured by a second temperature sensor in the flow direction after the filter. The heat output $P_{Reg}$ is calculated in step S16 from this temperature value $T_{after}$. In step S17 it is verified whether an adequate heat output $P_{Reg}$ was produced during regeneration (greater than a minimum value $P_{min}$ and smaller than a maximum value $P_{max}$). If the heat output is too high during regeneration, the filter becomes too hot and is permanently damaged. Conversely, if the heat output $P_{Reg}$ produced is too small, this means that the filter has not been regenerated adequately and a certain proportion of soot still remains in the filter. In step S17 it is also verified whether the initial value $W_n$ is below a second threshold value $W_{upper\_n}$. This is the case during regeneration at point $S_3$, so step S18 follows. The index n alone is thereby increased by one. In step S19 the maximum value is traced for the particle filter load (first threshold value) $W_{max\_n}$. A particle load value $W_{th\rho el}$ is thereby only added to the previous initial value of the $n^{th\rho el}$ regeneration $W_{n-1}$. This ensures that the filter can be loaded to the maximum without holding too much carbon, i.e., soot. This alternative allows a fuel saving potential during regeneration. The method then moves on to step S20 to the start condition for S1.

Should regeneration not be successful, as for example at point $S_4$, where the condition from step S21 is not satisfied (the heat output generated is too small), in step S22 it is verified whether the initial start value $W_n$ is above the second threshold value $W_{upper\_n}$. At point $S_4$ the index n is equal to 1. The slope 5 at point $S_4$ remains above the second threshold $W_{upper\_1}$, as regeneration is suspended at point 6. After this step S22, if the operating conditions (partial load range) of the internal combustion engine are favorable or utilization of the engine processor (ECU) is at a low level, regeneration is once again repeated in step S14. FIG. 2 shows this at point $S_5$.

The new regeneration is below the second threshold $W_{upper\_1}$ and even attains the initial value $W_1$.

In step S6 the filter was once again successfully regenerated, thereby achieving the initial filter load value $W_3$, which, as can be seen, is above the other previous initial load values. In this specific instance it is determined with the continuous test loop between step S1 and S12 that at point $S_7$ the fourth load value no longer changes and therefore its differentiation dW in step S11 is equal to zero. After the distance covered $S_7$ the internal combustion engine is not in high-load operation, so step S13 is followed by step S30. A soot model, illustrated schematically in FIG. 4, is used to calculate the pressure loss $\Delta p_{Model}$ to be expected at the particle filter and the filter load value $W_{Model}$ to be expected at the particle filter. If the measured values $\Delta p$ and $W$ differ too much from the values $\Delta p_{Model}$ and $W_{Model}$ calculated from the soot model, in step S31 a filter breakdown is identified from the plateau 7.

If the measured values are within the calculated values, step S12 follows, which jumps to step S1.

In FIG. 4 the values $\Delta p_{Model}$ and $W_{Model}$ to be expected are calculated using the soot model 10 from the volumetric flow taken in $Q_{suction}$, from the start value after the nth regeneration $W_n$, from the number of regeneration operations n carried out by the controller and from the first and second temperatures $T_{pre}$ and $T_{after}$. Further filter sizes can be taken into account to refine the soot model.

This application claims the priority, under 35 U.S.C. §119, of German patent application No. 10 2004 026 589.5, filed Jun. 1, 2004; the entire disclosure of the prior application is herewith incorporated by reference.

We claim:

1. A method of monitoring a particle filter disposed in an exhaust gas system of an internal combustion engine, the method which comprises the following steps:
    a) measuring a pressure loss at the particle filter;
    b) obtaining a value for a volumetric flow of exhaust gas;
    c) calculating a filter load value from the pressure loss and the volumetric flow of exhaust gas;
    d) recording the filter load value as a function of a drive parameter;
    e) differentiating the filter load value with respect to the drive parameter to form a filter load differentiation; and
    f) evaluating the filter load differentiation, and concluding a particle filter breakdown when the filter load differentiation is less than or equal to zero.

2. The method according to claim 1, wherein the internal combustion engine is a self-igniting combustion engine.

3. The method according to claim 1, which comprises utilizing at least one of an operating time of the internal combustion engine and a distance covered by a vehicle with the internal combustion engine as the drive parameter.

4. The method according to claim 1, wherein step b) comprises measuring the volumetric flow of exhaust gas with an air mass sensor disposed, in an exhaust gas flow direction, after the particle filter.

5. The method according to claim 1, wherein step b) comprises calculating the volumetric flow of exhaust gas from a first temperature, measured in a flow direction before the filter, of air taken in by the internal combustion engine, and from a quantity of fuel injected into the internal combustion engine.

6. The method according to claim 1, which comprises implementing at least one of steps e) and f) in a mean load range.

7. The method according to claim 1, which comprises executing at least one of steps e) and f) when a processor controlling the internal combustion engine is subject to a low level of utilization.

8. The method according to claim 1, which comprises excluding from evaluation in step f) filter load values recorded during high-load operation of the internal combustion engine.

9. The method according to claim 1, wherein step c) comprises correcting the filter load value as a function of a number of particle filter regeneration operations carried out.

10. The method according to claim 1, wherein in step f) a plausibility test carried out using a particle model is also not satisfied.

11. The method according to claim 10, wherein the particle model calculates a pressure loss to be expected and a filter load value to be expected from a first temperature measured before the filter in the flow direction and from a second temperature measured in the flow direction after the particle filter and from the volumetric flow of air taken into the internal combustion engine.

* * * * *